(12) United States Patent
Lawry et al.

(10) Patent No.: US 10,133,809 B1
(45) Date of Patent: *Nov. 20, 2018

(54) WATCH TIME BASED RANKING

(71) Applicant: Google LLC, Mountain View, CA (US)

(72) Inventors: James Lawry, Brooklyn, NY (US);
Bryan M. Kressler, Madison, NJ (US);
Stanislav Plamenov Angelov, New York, NY (US); David Kliger Elson, Brooklyn, NY (US); Christian Kaiserlian, New York, NY (US); David Agraz, Jersey City, NJ (US); Jeremy Hylton, Easton, PA (US); Phong Thanh Pham, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 14/754,253

(22) Filed: Jun. 29, 2015

Related U.S. Application Data

(63) Continuation of application No. 13/787,096, filed on Mar. 6, 2013, now Pat. No. 9,098,511.
(Continued)

(51) Int. Cl.
*G06F 17/30* (2006.01)

(52) U.S. Cl.
CPC .. *G06F 17/30657* (2013.01); *G06F 17/30687* (2013.01); *G06F 17/30781* (2013.01);
(Continued)

(58) Field of Classification Search
CPC ......... G06F 17/30867; G06F 17/30864; G06F 17/30035; G06F 13/00; G06F 15/173; G06F 17/30038; G06F 17/30244; G06F 17/30424; G06F 17/3053; G06F 17/30675; H04N 21/44222; H04N 21/2743; H04N 21/6125; H04N 21/6175; H04N 21/6582
(Continued)

(56) References Cited

U.S. PATENT DOCUMENTS 6,513,160 B2  1/2003  Dureau
6,895,438 B1  5/2005  Ulrich
(Continued)

FOREIGN PATENT DOCUMENTS

EP    2131306      12/2009
WO  2005/018218   2/2005

*Primary Examiner* — Dangelino N Gortayo
(74) *Attorney, Agent, or Firm* — Fish & Richardson P.C.

(57) ABSTRACT

Methods, systems, and apparatus, including computer programs encoded on computer storage media, for ranking search results. One of the methods includes identifying one or more sessions for a query and associating watch times of the respective resources watched in the sessions with the query. One or more watch time signals are calculated for a first resource and the query based on the watch times associated with the query. A first search result responsive to the query is obtained, wherein the first search result identifies the first resource and has an associated score S. A new score S' is calculated based on a least S and a watch time function, the watch time function being a function of the one or more watch time signals. The new score S' is provided to a process for ranking search results including the first search result.

23 Claims, 3 Drawing Sheets

Related U.S. Application Data

(60) Provisional application No. 61/709,124, filed on Oct. 2, 2012.

(52) U.S. Cl.
CPC .. *G06F 17/30864* (2013.01); *G06F 17/30029* (2013.01); *G06F 17/30044* (2013.01)

(58) Field of Classification Search
USPC ........ 707/725, 603, 706, 709, 722, 723, 748
See application file for complete search history.

(56) References Cited

U.S. PATENT DOCUMENTS

| | | | |
|---|---|---|---|
| 6,934,964 B1 | 8/2005 | Schaffer et al. | |
| 7,836,009 B2 * | 11/2010 | Paczkowski | ...... G06F 17/30884 |
| 7,930,391 B1 | 4/2011 | Holt | |
| 8,220,023 B2 * | 7/2012 | Seldin | ................ H04N 5/44543 |
| | | | 725/44 |
| 8,316,390 B2 | 11/2012 | Zeidman | |
| 8,615,506 B2 | 12/2013 | Lu et al. | |
| 8,713,592 B2 | 4/2014 | Patterson et al. | |
| 8,745,647 B1 * | 6/2014 | Shin | ...................... H04N 21/442 |
| | | | 725/10 |
| 8,949,899 B2 * | 2/2015 | Errico | ............... G06F 17/30035 |
| | | | 725/46 |
| 9,153,141 B1 * | 10/2015 | Kane, Jr. | .................. G09B 7/00 |
| 9,215,423 B2 * | 12/2015 | Kimble | .............. H04N 7/17318 |
| 2011/0161318 A1 * | 6/2011 | Lyon | ................ G06F 17/30038 |
| | | | 707/729 |
| 2011/0271314 A1 | 11/2011 | Hoshall | |
| 2012/0253952 A1 | 10/2012 | Rafenomanjato | |
| 2014/0046965 A1 * | 2/2014 | Tian | .................. G06F 17/30648 |
| | | | 707/749 |
| 2014/0074858 A1 | 3/2014 | Kalmes et al. | |

\* cited by examiner

WATCH TIME BASED RANKING

CROSS-REFERENCE TO RELATED APPLICATIONS

This application is a continuation of U.S. patent application Ser. No. 13/787,096, filed on Mar. 6, 2013, entitled "Watch Time Based Ranking," which claims the benefit under 35 U.S.C. § 119(e) of the filing date of U.S. Provisional Patent Application No. 61/709,124, filed on Oct. 2, 2012, entitled "Watch Time Based Ranking" Both of the above-identified patent applications are herein incorporated by reference.

BACKGROUND

This specification relates to Internet search engines, and more particularly to ranking search results that are identified as being responsive to search queries.

Internet search engines aim to identify resources, e.g., web pages, images, text documents, multimedia content, e.g., videos, that are relevant to a user's information needs and to present information about the resources in a manner that is most useful to the user. Internet search engines generally return a set of search results, each identifying a respective resource, in response to a user submitted query.

SUMMARY

This specification describes how a system can adjust a score for a search result that identifies a resource and was obtained in response to a search query to reflect user watch times of the resource, e.g. the times that users spend watching video content. In general, the system boosts the score for a search result if users historically tend to watch the resource for longer periods of time, and may demote the score if users historically tend to watch the resource for shorter periods of time.

In general, one innovative aspect of the subject matter described in this specification can be embodied in methods that include the actions of identifying one or more sessions for a query, each session comprising a plurality of respective resources watched by a respective user beginning with a first resource that was identified by a search result responsive to the query followed by one or more second resources, wherein each second resource was associated with another resource in the session by a respective link, and wherein the user visited each second resource by following the links; associating watch times of the respective resources watched in the sessions with the query; calculating one or more watch time signals for a first resource and the query based on the watch times associated with the query; obtaining a first search result responsive to the query, wherein the first search result identifies the first resource and has an associated score S; calculating a new score S' based on at least S and a watch time function, the watch time function being a function of the one or more watch time signals; and providing the new score S' to a process for ranking search results including the first search result. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Each respective link is a reference to a respective suggested resource. The resources in a session comprise video content, and wherein a watch time of a resource is a length of time that a user spent watching the video content. The actions include computing the watch times for a particular session using pings received during the session, wherein each ping identifies a point in video content that a user has reached. The watch time function is given by $S'=S \times M_{Q,D_i}$, wherein $M_{Q,D_i}$ is a watch time multiplier computed from the one or more watch time signals for the query and the first resource. The watch time multiplier is based on a product of two or more of the watch time signals for the first resource. One of the watch time signals is a document-query fraction score that is based on a portion of a total k of the watch times associated with the query that are attributable to the first resource. One of the watch time signals is a relative document performance score that is based on ratio of (1) an average session watch time for the first resource in the sessions of the query, to (2) an average session watch time for all resources in the sessions of the query. One of the plurality of watch time signals is a clicks per impression score that is based on a ratio of (1) a number of times the first resource in the sessions of the query was selected as a search result to (2) a number of impressions for the first resource in the sessions of the query. One of the plurality of watch time signals is a watch time per watch score that is based on an average session watch time for the first resource in viewing sessions of the query.

Particular embodiments of the subject matter described in this specification can be implemented so as to realize one or more of the following advantages. A system promoting search results using watch times can enable users to find more relevant and higher-quality search results, facilitates finding that may be overshadowed by less relevant resources found by other search methodologies, and can reduce the effort that users must exert to find the resources that they seek. A system using watch times to rank search results can also provide content providers with increased site usage and user engagement by promoting content having longer user watch times.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification relates to improvements in search systems that provide search results identifying digital resources containing content, e.g., one or more of text, images, video, or audio, that are hosted on one or more web servers in one or more locations and accessible over the Internet through a network address, e.g., a Uniform Resource Locator ("URL").

This specification refers to "watch times" of digital resources. In general, "watch time" refers to the total time that a user spends watching a video. However, watch times can also be calculated for and used to rank other types of content based on an amount of time a user spends watching the content, e.g. an amount of time spent watching a video, viewing a particular web page, or listening to an audio file.

This specification describes how a search system can use watch times to rank search results, e.g. by increasing ranking scores of search results that identify resources having longer watch times and by decreasing ranking scores of search results that identify resources having shorter watch times.

Figure 1:
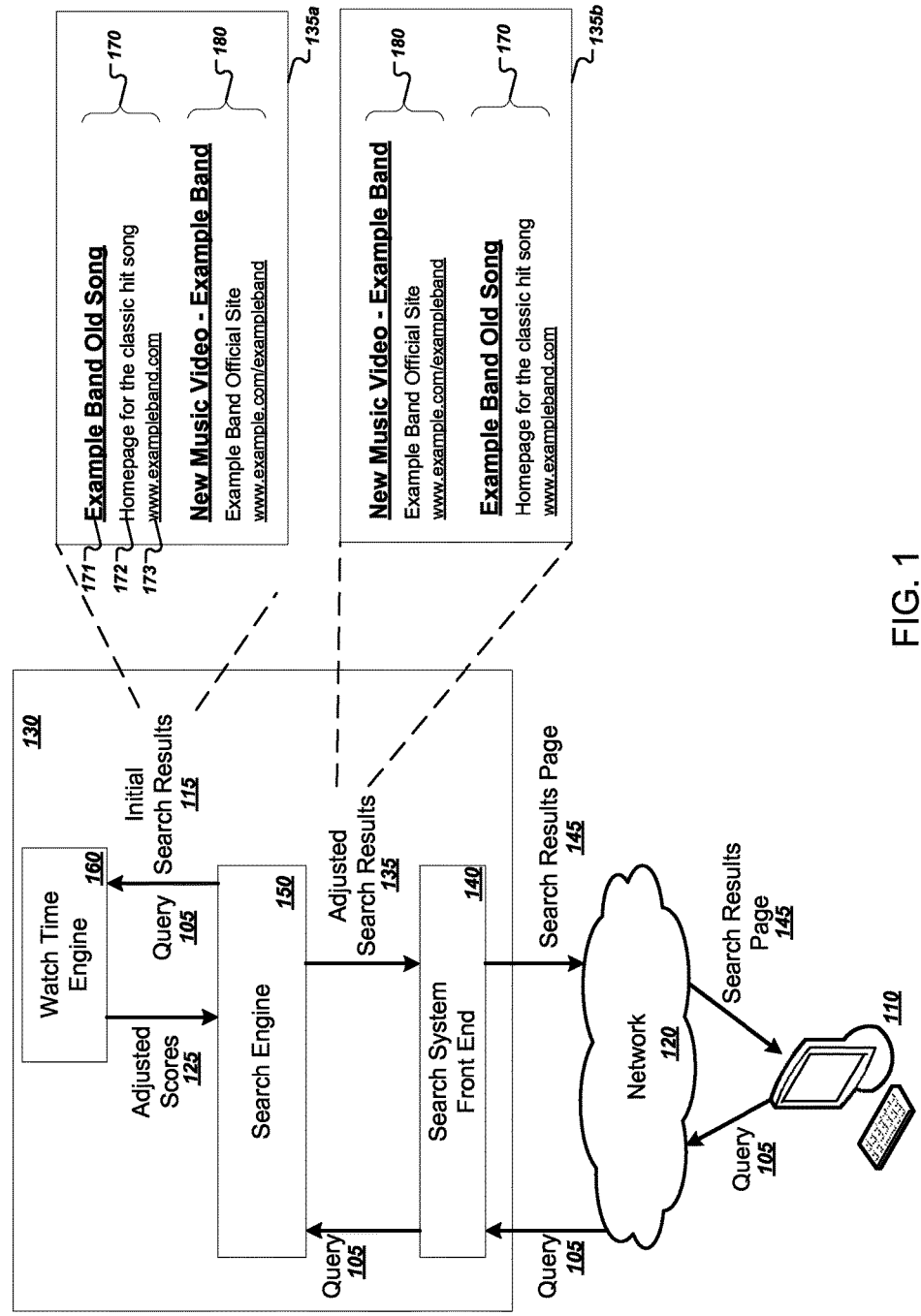
FIG. 1 illustrates an example search system.

FIG. 1 illustrates an example search system 130. The search system 130 is an example of an information retrieval system in which the systems, components, and techniques described below can be implemented.

A user device 110 can be coupled to the search system 130 through a data communication network 120. In general, the user device 110 transmits a query 105 over the network 120 to the search system 130. The search system 130 responds to the query 105 by generating a search results page 145, which is transmitted over the network 120 to the user device 110 in a form that can be presented on the user device 110, e.g., as displayed in a web browser or in a viewing application on the user device 110. For example, the search results page 145 can be a markup language document, e.g., HyperText Markup Language or eXtensible Markup Language document. A component of the user device 110, e.g., a web browser, renders the document in order to present the search results page 145 on a display device.

The user device 110 can be any appropriate type of computing device, e.g., a server, mobile phone, tablet computer, notebook computer, music player, e-book reader, laptop or desktop computer, PDA (personal digital assistant), smart phone, television set or set-top box, video game console, or other stationary or portable device, that includes one or more processors for executing program instructions and memory. The user device 110 can include computer readable media that store software applications, e.g., a browser or layout engine, one or more input devices, e.g., a keyboard, a mouse, a touch sensitive display, a microphone, or a camera, a communication interface, and a display device.

The network 120 can be, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination of such networks.

The search system 130 can be implemented as computer programs executing on one or more computers in one or more locations that are coupled to each other through a network, e.g., network 120. The search system generally includes a search system front end 140, a search engine 150, and a watch time engine 160.

In general, the search system front end 140 receives the query 105 from the user device 110. The search system front end 140 routes the query 105 to the appropriate engines in the search system 130 so that the search system 130 can generate the search results page 145. In addition, the search system front end 140 can provide the resulting search results page 145 to the user device 110.

Two or more of a search system front end, a watch time engine, and a search engine, e.g., the search system front end 140, the watch time engine 160, and the search engine 150, respectively, may be implemented on the same computing device, or on different computing devices.

In addition, the search system 130 can include multiple types of search engines, each search engine designed to obtain search results for a particular type of resource, e.g., web pages, news articles, images, videos, blog postings, or other types of resources on the Internet. Each such search engine will generally include a ranking engine for the corresponding type of resource to rank the resources that have been identified.

After receiving the query 105, the search engine 150 generates initial search results 115 that identify resources that satisfy the search query, each with an assigned search result score. To illustrate operation of the search engine 150 when not adjusting the scores of the initial search results using watch time data, the search engine 150 could, for example, rank the initial search results 115 by the initially assigned search result scores. The search system could then generate, e.g., using the search system front end 140, a search results page 145, illustrated as search results page 135a, that identifies the initial search results 115 obtained by the search engine 150. For example, each of the search results can include, but are not limited to, titles, text snippets, images, links, e.g., hyperlinks, reviews, user ratings, or other information. For example, the search result 170 includes a title 171, a snippet 172, and a display link 173.

Search results on search results page 135a are ranked by search result scores, with the search results having a better score being considered to be better search results for the query and thus being presented in a better position, e.g., nearer to the top of the search results page 135a.

Using watch time engine 160 to recompute adjusted search result scores 125 using watch time data will generally alter the ranking reflected by scores of the initial search results 115, resulting in the search engine 150 generating adjusted search results 135. A search results page 135b that reflects the adjusted search results 135 will thus differ from a search results page 135a generated using the initial search results 115. For example, watch time engine 160 can assign a highest adjusted search result score to search result 180 for the "New Music Video" of an example band after adjusting the search result scores using watch time data.

The watch time engine 160 can be implemented as a separate module or as part of the search engine 150 or a ranking engine of the search engine 150. In addition, the search engine 150 can make further ranking adjustments to scores of the initial search results 115 before providing the adjusted search results 135 to the search system front end 140.

The watch time engine 160 takes as input the query 105 and the initial search results 115. Then, the watch time engine can generate for each query and initial search result pair an adjusted search result score 125 and assign the adjusted search result scores to one or more of the initial search results 115. The adjusted search result scores 125 can be based on the search result scores initially assigned by the search engine 150, or the adjusted search result scores 125 can be generated anew.

Figure 2:
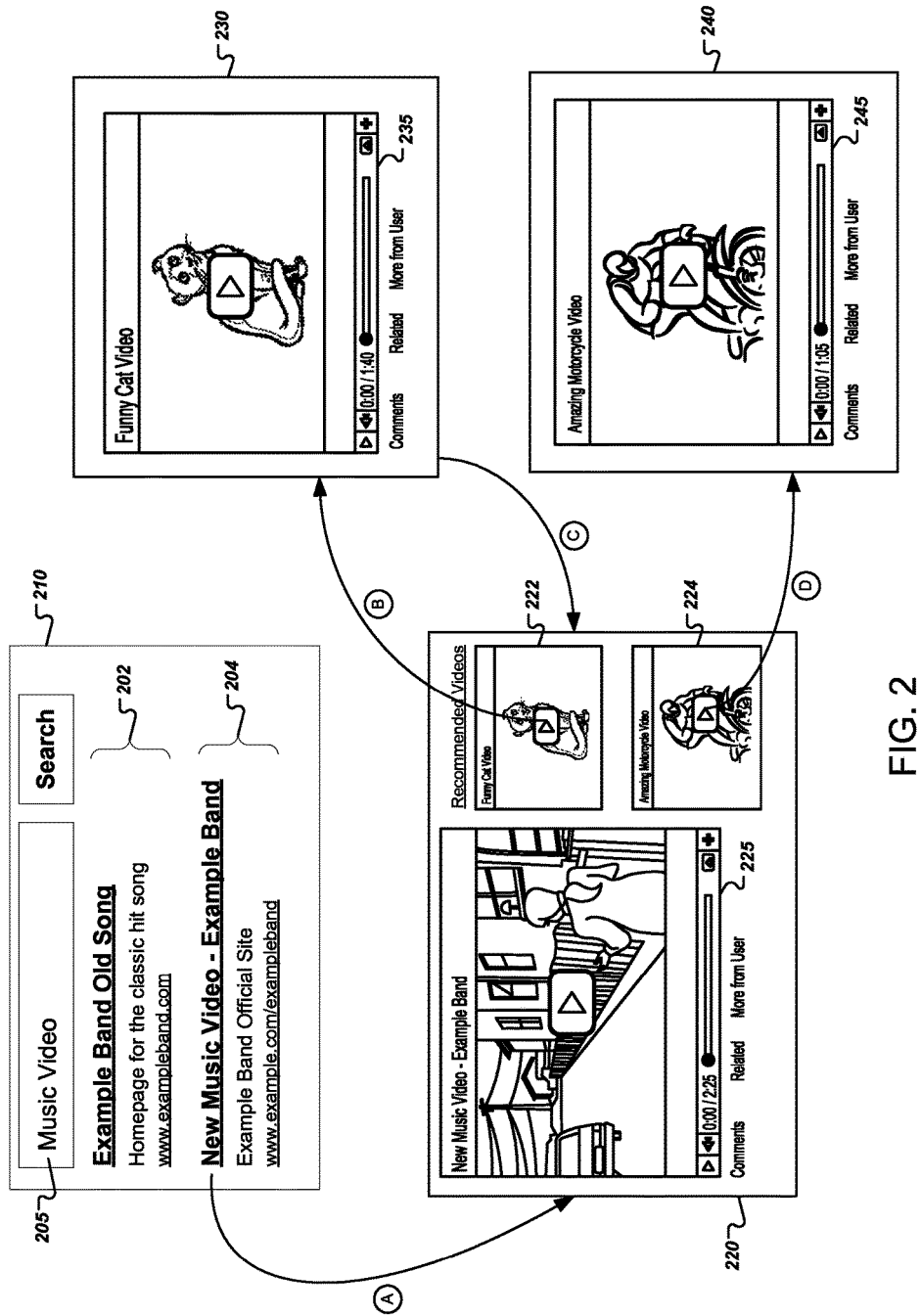
FIG. 2 is a diagram that illustrates resources visited during an example viewing session.

FIG. 2 is a diagram that illustrates resources visited during an example viewing session. After issuing a search query and selecting a particular search result, a user will generally watch video content of a first resource identified by the selected search result for some amount of time. In this example, the watch times of a resource refer to time that a user spent watching video content. From the first resource, the user may also navigate to other resources linked from the first resource. The system can consider the chain of resources visited after a user issues the search query to be in a "viewing session." In some implementations, each viewing session is associated with the search query that started the viewing session. The system can determine viewing sessions associated with search queries by obtaining data from a session logs database that stores session data that characterizes viewing sessions by users and watch times for particular resources visited by users during a viewing session.

By way of illustration, the search system 130 can receive a query 205 and provide a search results page 210 listing search results 202, 204 that identify web pages that include video content. The session logs database can store for a particular viewing session the search query issued and the number of highest-ranked search results provided in response to the search query. The session logs database can also store for each viewing session one or more resources visited during the viewing session and respective watch times for each resource visited.

During state "A", a user may select search result 204, causing the user's web browser to navigate to web page 220 that includes video content 225. The web page 220 has links 222, 224 to suggested, recommended, or related videos. Similarly, the video content 225 on the web page 220 may also identify and link to other suggested, recommend, or related videos.

The user can initiate playback of the video content 225 on web page 220 and watch the video content 225 for some amount of time. The amount of time the user watched the video content 225 can be recorded in the session logs database. In some implementations, to collect watch times, a web page 220 hosting video content 225 can direct the user's web browser or viewing application to issue a "ping" back to the search system, which can be in the form of a hypertext transfer protocol (HTTP) request. In some implementations, a ping identifies a particular point in the video that the user has reached. The system can use pings at different intervals, e.g. at every 1, 5, or 10 seconds. In some other implementations, a user's web browser can record a total watch time of a resource and can forward the total watch time back to the search system.

If the user skips around in a video, e.g. rewinds or navigates to different points in the video content, the system can continue to accumulate watch time for the video. In other words, the watch time recorded for a video may exceed the length of the video.

During state "B", the user can select a link 222 to a recommended video, which causes the user's web browser to navigate to web page 230 that includes video content 235 of the recommended video. The user can initiate playback of the video content 235 and watch for some amount of time, which the system can also record for the viewing session. Web page 230 may also have links to other videos that the user can select that the system can also consider part of the viewing session.

During state "C", the user can select the web browser's "Back" button, which causes the web browser to return to web page 220. The user may also reinitiate video playback of video content 225, which the system can further record for the viewing session. The system can continue to accumulate watch time for the video content 225, or the system can record a second instance of the user initiating playback of video content 225 and corresponding watch time.

During state "D", the user can select a link 224 to another recommended video, causing the user's web browser to navigate to web page 240 that includes video content 245. The user can initiate playback of the video content 245, and the system can record the corresponding watch time for the viewing session.

The system can consider a viewing session to have ended due to a variety of events. For example, the system can consider the user issuing another search query to be the end of a viewing session. The system can also consider a viewing session to have ended when more than a threshold amount of time has passed between resource visits or when the data for a particular viewing session ends. The system can also consider a viewing session to have ended when a user navigates to a different website, e.g. using a navigation bar in a web browser.

In some implementations, the system considers a new viewing session to have started with the selection of a search result provided for the search query. For example, if the user returns to the initial search results page 210, e.g. by selecting the "Back" button on a web browser or by reopening a browser window with the initial search results page 210, and then selects a different search result 202 that was provided for the same query, the system can consider the selection of the different search result 202 to start a new viewing session. A user can also start multiple new viewing sessions simultaneously, for example, by opening multiple search results from the search results page 210 in new browser windows or tabs.

The system can consider the chain of navigations from the search results page 210 to a first resource and then to potentially other resources as belonging to the same viewing session. In this example, the system can consider the viewing session to include visits to web page 220, 230, and 240, and will record watch times for video resources 225, 235, and 245 watched during the viewing session.

The system can use the viewing sessions associated with a query to compute watch counts and watch times for query-resource pairs. For a query Q and a resource $D_i$ watched during a viewing session associated with the query, the system can compute a watch count $n_i$ as the number of times the resource $D_i$ was watched, as well as $n_i$ corresponding watch times, e.g. $[w_{i,1}, w_{i,2}, \ldots w_{i,ni}]$. This specification will refer to the set of watch times $[w_{i,1}, w_{i,2}, \ldots w_{i,ni}]$ computed over all viewing sessions associated with the query as watch times for the query. The watch times are generally recorded as a single time duration, e.g. a number of seconds, minutes, or hours that a user watched the resource.

In some implementations, the system considers a video to have been watched at all if a ping indicates that video playback started. In other words, a visit to a web page may not be counted as a watch of a video on the web page. Thus, if a user visits a web page including a video but does not initiate video playback, the corresponding watch time of the video may not be recorded or may be recorded as zero.

The system can also use the session logs to compute selection statistics for query-resource pairs. The selection statistics can be measures of the tendency of users to select a particular resource when they see the search result provided in response to the query. The tendency can be measured in terms of impressions. An "impression" is defined as an instance of a search result being selected by a user or being ranked above a different search result that was selected by the user. In other words, a search result impression can be thought of as an instance of the user seeing the search result.

The system can consider as a "click" any user action made with respect to a search result that initiates a request for the resource identified by the search result, e.g., a cursor click on a Uniform Resource Locator (URL) of a resource in the search result in a graphical user interface of a web browser. Optionally, in order for a user action to be considered a click, it can also be required that the user's watch time of the resource be for a minimum threshold length of time. Although the user action with respect to a search result is referred to by this specification as a "click," the action can also be a voice-based selection, or a selection by a user's finger on a presence-sensitive input mechanism, e.g., a touch-screen device, or any other appropriate selection mechanism.

In some implementations, the system can provide, additionally or alternatively to providing a search results page 210, a playlist of video content that plays automatically. The viewing session would thus include videos played during playback of the playlist. Watch time variations for automatically played content would vary based on the user stopping or skipping a video, rather than by the user initiating playback.

In some implementations, the system can recompute watch time and selection statistics on a rolling basis, for example, each day, week, or month. The system can also use only data generated during a recent time period, e.g. data generated during the last 1 week, 1 month, or 6 months. The statistics can also be computed per geographic region, e.g. for users in a particular country, or per language, e.g. for users that prefer a particular language.

Figure 3:
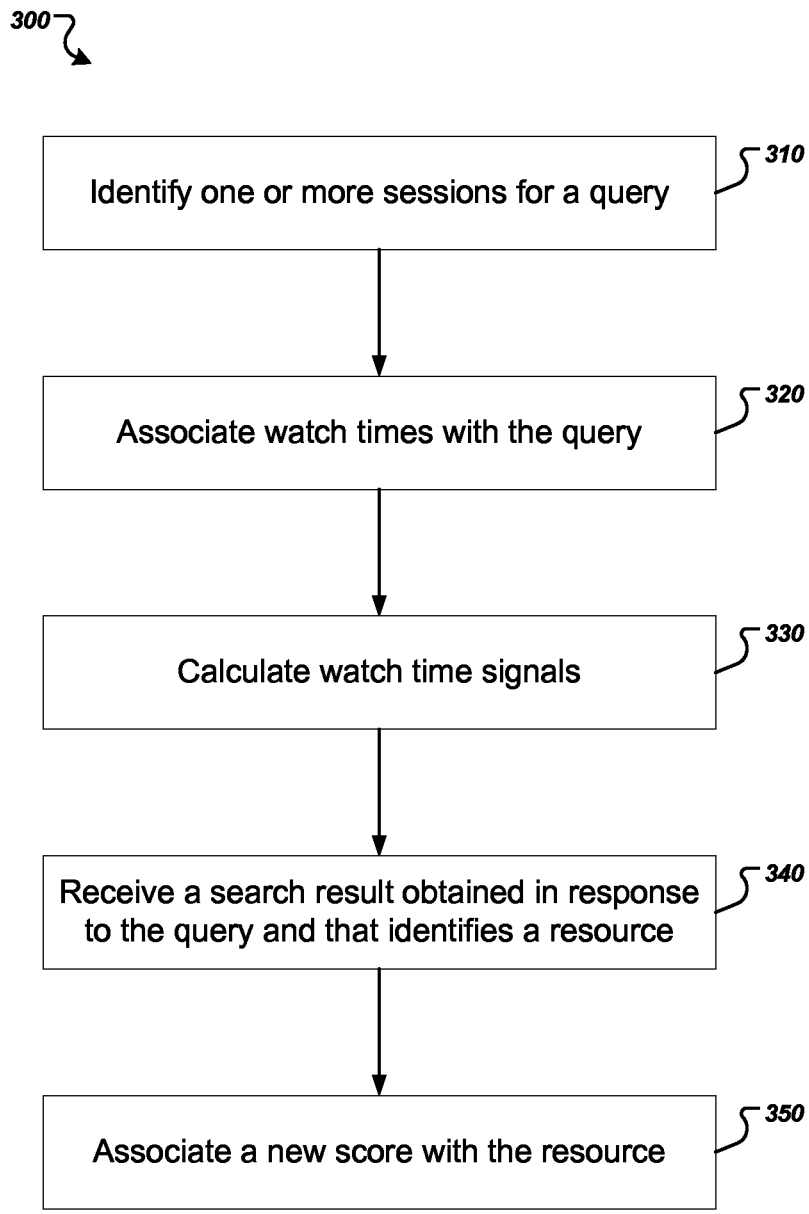
FIG. 3 is a flow chart of an example process for adjusting search result scores.

FIG. 3 is a flow chart of an example process 300 for adjusting search result scores. In general, the system receives a query, a search result, and a search result score. The system can then compute an adjusted search result score for the search result based on watch time data stored, e.g. in a session logs database. The process 300 can be implemented by one or more computer programs installed on one or more computers. The process 300 will be described as being performed by a system of one or more computers, e.g. the watch time engine 160 of FIG. 1.

The system identifies one or more sessions for a query (310). For example, the system can read session data stored in a session logs database that identifies one or more sessions for a query. The session data can include a sequence of one or more resources visited after a user initiated the query and corresponding watch times for each of the resources.

The system associates watch times with the query (320). Using the sessions for a query, the system can calculate watch counts and watch times for each of a set of resources that occur in the viewing session. Thus, for a query-resource pair, the system can calculate a set of one or more watch times.

The system calculates watch time signals (330). The system can generally prefer resources that users tend to watch for longer times over resources that users tend to watch for shorter times. The system can use a variety of statistical indicators, or "signals," computed from the session logs database to determine the watch time tendencies of users. The system can compute multiple signals and combine the multiple signals in various ways. In some implementations, the system combines the signals by computing a watch time multiplier and computes an adjusted search result score by computing the product of the initial search result score and the watch time multiplier. In some other implementations, the system can combine the signals and compute an adjusted search result score by adding the combined value to the initial search result score or by combining the initial search result score with the signals in some other way.

The system can transform the raw computed signals into multipliers in order to adjust search result scores. To do so, the system can use a variety of utility functions to transform raw signals into multipliers.

An example utility function is a convexity curve $conv_c(x)$, given by:

$$conv_c(x) = \frac{x}{c + x(1-c)}.$$

The convexity curve provides smoothly increasing values that increase quickly at first, and then more slowly, as x increases from 0 to 1, if c<1, and values that increase slowly at first, and then more quickly, as x increases from 0 to 1, if c>1.

Another example utility function is a low-data backoff curve, given by:

$$low_b(n) = \frac{n}{n+b}.$$

This factor tends to 1 when n is very large and tends to 0 when n is small, where b is an empirically chosen low-data backoff parameter that governs how quickly the factor tends to 1 as n increases.

Another example utility function is a scaling function given by:

$$scale(\lambda; x) = 1 + \lambda(x-1),$$

where x is the value being transformed and $\lambda$ is the scaling parameter that represents the slope of the curve.

The system can combine these utility functions in various ways to transform raw watch time statistics into useful multipliers.

An example watch time signal is a document-query fraction (dqf) score. The dqf score is a measure of how much of a query's k total watch times are attributable to a particular resource $D_i$. Thus, for a query Q and a resource $D_i$ having watch count $n_i$ the dqf score, $dqf(Q, D_i)$, is given by:

$$dqf(Q, D_i) = \frac{\sum_{j=1}^{n_i} w_{i,j}}{\sum_{k,j} w_{k,j}}.$$

New resources will naturally have very low dqf scores because a new resource will have had little opportunity to accumulate a portion of a query's total watch time. Therefore, the system can address this by computing the total watch time for the query only from the point in time that the resource $D_i$ received its first impression. In other words, the total watch time for the query is only computed from a point in time that the resource $D_i$ had an opportunity to contribute watch time to the query.

The system can transform the dqf score into a multiplier that can be used for adjusting search result scores. In some implementations, the dqf multiplier is given by:

$$M_{Q,D_i}^{(1)}(\alpha) = \min[\mu_1, 1 + v_i \sigma_1 \cdot conv_{c_1}(\alpha) \cdot low_{b_1}(n_i)],$$

where $\alpha$ is the raw dqf score of resource $D_i$ for query Q and $v_i$ is a variant penalty parameter for $D_i$ that represents a degree of term variant matching used to retrieve $D_i$ for Q. The variant penalty parameter can range from 0-1. The convexity parameter $c_1$ and the low-data backoff parameter $b_1$ can be set empirically. The system can also use a cap on the final value, $\mu_1$.

Another example watch signal is relative document performance (rdp) score. The rdp score is a ratio of (1) the average viewing session watch time for resource $D_i$ in viewing sessions of Q, to (2) the average viewing session watch time for all documents in viewing sessions of Q. The average for the rdp score can be the geometric mean or any other appropriate average. Thus, for a query Q and a resource $D_i$ having watch count $n_i$ the rdp score, $rdp(Q, D_i)$, can be given by:

$$rdp(Q, D_i) = \frac{\left[\prod_{j=1}^{n_i} w_{i,j}\right]^{\frac{1}{n_i}}}{\left[\prod_{k,j} w_{k,j}\right]^{\frac{1}{N}}},$$

where $w_{i,j}$ are watch times for resource $D_i$ and $w_{k,j}$ are watch times for all of N documents in viewing sessions of Q.

The system can transform the rdp score into a multiplier, given by:

$$M_{Q,D_i}^{(2)} = \begin{cases} conv_{c_2}\left[scale\left(v_i \cdot low_{b_2}(n_i); \frac{\beta}{\beta_1}\right)\right], & (\beta < \beta_1) \\ \min\left[\mu_2, scale\left(v_i \sigma_2 \cdot low_{b_2}(n_i); \frac{\beta}{\beta_1}\right)\right], & (\beta \geq \beta_1) \end{cases},$$

where $\beta$ is the raw rdp score of resource $D_i$ for query Q, and $v_i$ is the variant penalty parameter of $D_i$ for Q. The constant $\beta_1$ is a neutral point above which promotion occurs, and below which demotion occurs. The stretching parameter $\sigma_2$ can be used to enhance promotion. The convexity parameter $c_2$ and the low-data backoff parameter $b_2$ can be set empirically. The system can also use a cap on the promotion values, $\mu_2$.

Another example watch signal is clicks per impression (cpi) score. The cpi score is a ratio of a number of times a resource was selected as a search result to the number of impressions for the resource. Thus, for a query Q and a resource $D_i$ having $C_i$ clicks and $N_i$ impressions, the cpi score, $cpi(Q, D_i)$, is given by:

$$cpi(Q, D_i) = \frac{C_i}{N_i}.$$

The system can transform the cpi score into a multiplier, given by:

$$M_{Q,D_i}^{(3)} = scale\left(v_i \cdot low_{b_3}(N_i); \tilde{M}\left(\frac{\gamma}{\gamma_0}\right)\right),$$

and where:

$$\tilde{M}(\tilde{\gamma}) = \begin{cases} conv_{c_3}(\tilde{\gamma}), & (0 \leq \tilde{\gamma} \leq 1) \\ \min[\mu_3, scale(\sigma_3; \tilde{\gamma})], & (\tilde{\gamma} > 1) \end{cases}.$$

The value $\gamma$ is the raw cpi score of resource $D_i$ for query Q, and $v_i$ is the variant penalty parameter of $D_i$ for Q. The constant $\gamma_0$ is a neutral point that acts as a threshold between promotion and demotion. The convexity parameter $c_3$ and the low-data backoff parameter $b_3$ can be set empirically. The system can also use a cap on the maximum promotion value, $\mu_3$.

Another example watch signal is watch time per watch (wtpw) score. The wtpw score is the average viewing session watch time for resource $D_i$ in viewing sessions of Q. The average for the wtpw score can be the geometric mean. Thus, for a query Q and a resource $D_i$ having watch count $n_i$ the wtpw score, $wtpw(Q, D_i)$, is given by:

$$wtpw(Q, D_i) = \left[\prod_{j=1}^{n_i} w_{i,j}\right]^{\frac{1}{n_i}},$$

where $w_{i,j}$ are watch times for resource $D_i$ in viewing sessions of Q.

The system can transform the wtpw score into a multiplier, given by:

$$M_{Q,D_i}^{(4)}(\delta) = scale[v_i; \log_2(\max(1,\delta))] \cdot low_{b_4}(n_i),$$

where $\delta$ is the raw wtpw score of resource $D_i$ for query Q having $n_i$ watches, and $v_i$ is the variant penalty parameter of $D_i$ for Q. The low-data backoff parameter $b_4$ can be set empirically.

The system can combine one or more of the computed watch signals into a single watch time multiplier $M_{Q,D}$ that can be used to adjust the initial search result scores. In some implementations, the system computes $M_{Q,D}$ as the product of the individual multipliers, $\alpha_1$-$\alpha_n$, e.g. the multipliers as described above. Additionally, the individual multipliers can each be raised to a respective power value $p_j$. Additionally, a product of the individual multipliers, can be raised to a power P. In some implementations, $M_{Q,D}$ is given by:

$$M_{Q,D_i}(\alpha_i, \ldots,) = scale\left(v_i; \left[\prod_j M_{Q,D_i}^{(j)}(\alpha_j)^{P_j}\right]^P\right),$$

where $v_i$ is an optional variant penalty parameter of $D_i$ for Q used as a scaling factor.

The system receives a search result obtained in response to the query and that identifies a resource (340). The system then associates a new score with the resource (350). The system can adjust the search result score of a particular resource using the watch boost multiplier $M_{Q,D_i}$ for the query and the resource.

The system can compute the new search result score as a function of the watch boost multiplier $M_{Q,D_i}$. In some implementations, the new score is computed as product of the initial search result score S and the watch boost multiplier $M_{Q,D_i}$. In some implementations, the new score S' is given by:

$$S' = S \times M_{Q,D_i}.$$

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Additionally, the scoring functions described above need not use the same mathematical formulas. Other functional forms that are within the scope of the following claims could also achieve desirable results.

What is claimed is:

1. A method comprising:
   identifying one or more sessions for a first user query, wherein
      each session comprises a respective chain of respective resources attended to by a respective user that
      begins with a respective first resource that was identified by a respective first search result in response to the first user query from the respective user and continues with one or more respective subsequent resources that were each visited in the session by the user by invoking a link associated with a preceding resource in the chain;
   associating, with the first user query, a total user attention time of the respective resources attended to in the one or more sessions for the first user query, the total user attention time being a total of individual user attention times of the resources in the one or more sessions;
   responsive to receiving a second user query matching the first user query after the one or more sessions have ended:
      obtaining one or more second search results responsive to the second user query and one or more respective second search result scores for the second search results, each second search result identifying a corresponding resource;
      adjusting the respective second search result scores based on the total user attention time associated with the first user query;
      ranking the second search results based on the adjusted search result scores; and
      in response to the second search query, providing the ranked second search results.

2. The method of claim 1, wherein the first user query is the same as the second user query.

3. The method of claim 1, wherein the resources in a session comprise video content items, and wherein an individual user attention time of a resource is a length of time that a user spent watching a video content item.

4. The method of claim 3, further comprising:
   computing the watch times for a particular session using pings received during the session, wherein each ping identifies a point in a video content item that a user has reached.

5. The method of claim 1, wherein the resources in a session comprise web pages, and wherein an individual user attention time of a resource is a length of time that a user spent reviewing a web page.

6. The method of claim 1, wherein adjusting the respective second search result scores based on the total user attention time comprises:
   for each second search result, adjusting the second search result score by a multiplier that is a function of a signal that is derived from (i) the individual user attention times of the resources corresponding to the second search result (ii) the total user attention time associated with the first query.

7. The method of claim 6, wherein the signal is a document-query fraction (dqf) score.

8. The method of claim 6, wherein the signal is a relative document performance (rdf) score.

9. The method of claim 6, wherein the multiplier is based on a utility function of the signal, wherein the utility function is a convexity function, a low-data backoff function, or a scaling function, or a combination of two or more of them.

10. A system comprising:
    one or more computers and one or more storage devices storing instructions that are operable, when executed by the one or more computers, to cause the one or more computers to perform operations comprising:
    identifying one or more sessions for a first user query, wherein
       each session comprises a respective chain of respective resources attended to by a respective user that
       begins with a respective first resource that was identified by a respective first search result in response to the first user query from the respective user and continues with one or more respective subsequent resources that were each visited in the session by the user by invoking a link associated with a preceding resource in the chain;

associating, with the first user query, a total user attention time of the respective resources attended to in the one or more sessions for the first user query, the total user attention time being a total of individual user attention times of the resources in the one or more sessions;

responsive to receiving a second user query matching the first user query after the one or more sessions have ended:

obtaining one or more second search results responsive to the second user query and one or more respective second search result scores for the second search results, each second search result identifying a corresponding resource;

adjusting the respective second search result scores based on the total user attention time associated with the first user query;

ranking the second search results based on the adjusted search result scores; and in response to the second search query, providing the ranked second search results.

11. The system of claim 10, wherein the first user query is the same as the second user query.

12. The system of claim 10, wherein the resources in a session comprise video content items, and wherein a watch time of a resource is a length of time that a user spent watching a video content item.

13. The system of claim 12, the operations further comprising:

computing the watch times for a particular session using pings received during the session, wherein each ping identifies a point in a video content item that a user has reached.

14. The system of claim 10, wherein the resources in a session comprise web pages, and wherein a user attention time of a resource is a length of time that a user spent reviewing a web page.

15. The system of claim 10, wherein adjusting the respective second search result scores based on the total user attention time comprises:

for each second search result, adjusting the second search result score by a multiplier that is a function of a signal that is derived from (i) the individual user attention times of the resources corresponding to the second search result (ii) the total user attention time associated with the first query.

16. The system of claim 15, wherein the signal is a document-query fraction (dqf) score.

17. The system of claim 15, wherein the signal is a relative document performance (rdf) score.

18. The system of claim 15, wherein the multiplier is based on a utility function of the signal, wherein the utility function is a convexity function, a low-data backoff function, or a scaling function, or a combination of two or more of them.

19. A non-transitory computer storage medium encoded with a computer program, the computer program comprising instructions that when executed by a computing device cause the computing device to perform operations comprising:

identifying one or more sessions for a first user query, wherein each session comprises a respective chain of respective resources attended to by a respective user that begins with a respective first resource that was identified by a respective first search result in response to the first user query from the respective user and continues with one or more respective subsequent resource that were each visited in the session by the user by invoking a link associated with a preceding resource in the chain;

associating, with the first search query, a total user attention time of the respective resources attended to in the one or more sessions for the first user query, the total user attention time being a total of individual user attention times of the resources in the one or more sessions;

responsive to receiving a second user query matching the first user query after the one or more sessions have ended:

obtaining one or more second search results responsive to the second user query and one or more respective second search result scores for the second search results, each second search result identifying a corresponding resource;

adjusting the respective second search result scores based on the total user attention time associated with the first user query;

ranking the second search results based on the adjusted search result scores; and in response to the second search query, providing the ranked second search results.

20. The non-transitory computer storage medium of claim 19, wherein adjusting the respective second search result scores based on the total user attention time comprises:

for each second search result, adjusting the second search result score by a multiplier that is a function of a signal that is derived from (i) the individual user attention times of the resources corresponding to the second search result (ii) the total user attention time associated with the first query.

21. The non-transitory computer storage medium of claim 20, wherein the signal is a document-query fraction (dqf) score.

22. The non-transitory computer storage medium of claim 20, wherein the signal is a relative document performance (rdf) score.

23. The non-transitory computer storage medium of claim 20, wherein the multiplier is based on a utility function of the signal, wherein the utility function is a convexity function, a low-data backoff function, or a scaling function, or a combination of two or more of them.

* * * * *